United States Patent [19]
kaczerowski

[11] Patent Number: 4,689,783
[45] Date of Patent: Aug. 25, 1987

[54] DIGITAL SATELLITE EXCHANGE

[75] Inventor: André kaczerowski, Treguier, France

[73] Assignee: Compagnie Industrielle des Telecommunications Cit-Alcatel, Paris, France

[21] Appl. No.: 638,137

[22] Filed: Aug. 6, 1984

[30] Foreign Application Priority Data

Aug. 11, 1983 [FR] France .................................. 83 13212

[51] Int. Cl.[4] ...................... H04Q 11/00; H04Q 11/04
[52] U.S. Cl. ........................................ 370/56; 370/58; 379/333
[58] Field of Search ............................ 370/58, 56, 85; 179/18 FC; 379/333, 334

[56] References Cited

U.S. PATENT DOCUMENTS

| | | | |
|---|---|---|---|
| 4,021,619 | 5/1977 | Potter et al. | 370/56 |
| 4,309,766 | 1/1982 | Lechner et al. | 370/56 |
| 4,327,436 | 4/1982 | Ohara et al. | 370/56 |
| 4,571,721 | 2/1986 | Yasui et al. | 379/333 |

OTHER PUBLICATIONS

IEEE Transactions on Communications, vol. COM-27, No. 7, Jul. 1979 (New York, US) H. Sueyoshi et al., "System Design of Digital Telephone Switching NEAX61"-pp. 993-1001.

Colloque International de Commutation, May, 1979, (Paris-FR) R. Scheller et al., "A Local PCM Switching System for Voice and Data"-Session 22A, pp. 419–426, especially p. 422 paragragh 4 to p. 423, paragraph 4,2.

Proceedings of the IEEE, vol. 66, No. 2, Feb. 1978, (New York-US), D. K. Melvin "Microcomputer Applications in Telephony", pp. 182–191.

Primary Examiner—Douglas W. Olms
Assistant Examiner—Frank M. Scutch, III
Attorney, Agent, or Firm—Sughrue, Mion, Zinn, Macpeak & Seas

[57] ABSTRACT

A digital satellite exchange for connecting analog and digital subscriber lines comprises a digital control unit and subscriber line digital concentrators of at least one of the following types: local analog subscriber line type, remote analog subscriber line type, local digital subscriber line type, remote digital subscriber line type, remote analog/digital subscriber line type. Each concentrator is connected to the control unit by a multiplex link. The control unit concentrates the multiplex links and is connected to a digital subscriber exchange by a further multiplex link.

4 Claims, 6 Drawing Figures

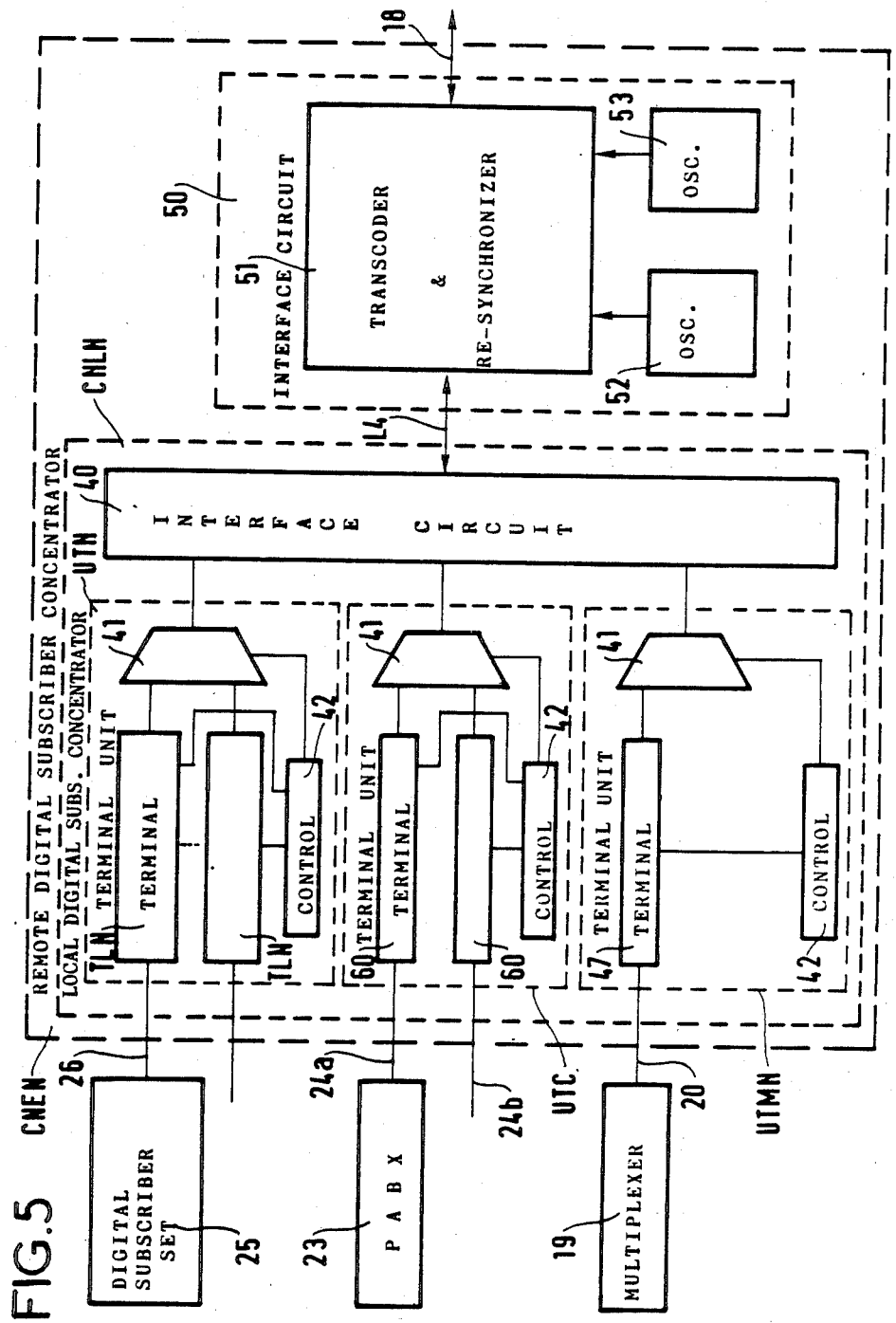

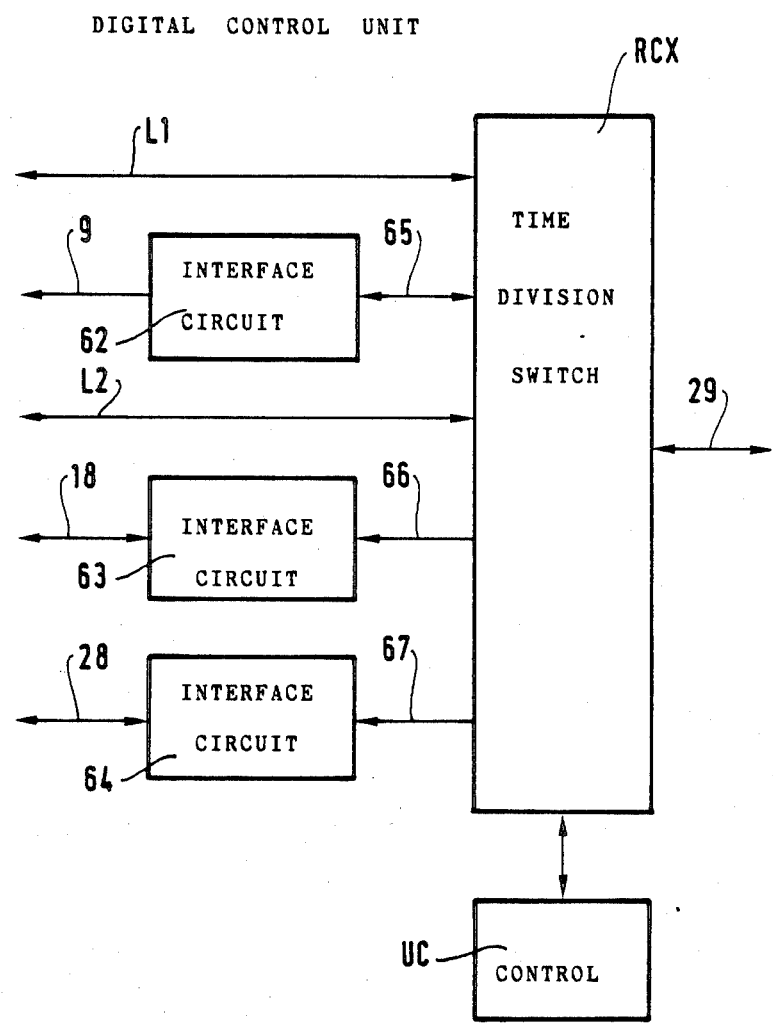

DIGITAL SATELLITE EXCHANGE

BACKGROUND OF THE INVENTION

1. Field of the invention

The invention concerns the connection of analog and digital subscriber lines, whether they are located near the digital local exchange or remotely therefrom, and is more particularly concerned with a digital telephone network subscriber exchange.

2. Description of the prior art

A digital local exchange must implement analog-to-digital conversion of speech signals from analog subscriber lines. This conversion is carried out in a subscriber line connection unit located either in the exchange itself or in the satellite exchange nearest the subscriber.

French Pat. No. 2 144 109 entitled Subscriber Line to Exchange Connection Unit for Time-division Switching Systems, corresponding to U.S. Pat. No. 3,941,947 describes a connection unit which may be either local, that is to say installed in the telephone exchange, or remote, that is to say constituting a satellite exchange connected to the exchange by 2 Mbit/s multiplex lines.

In digital exchanges, the concentration of subscriber lines is carried out either before or after analog-to-digital conversion, and the interfaces are always the same with analog subscriber lines on one side and 2 Mbit/s digital links on the other side.

Connection units of this kind with purely analog subscriber interfaces mean that a certain number of subscribers are without access to the advantages of digitization of the telephone network. Groups of geographically dispersed subscribers, generally remotely located, are connected to the exchange by means of shared lines, analog concentrators or analog multiplexers. All these devices are independent of the switching system and their installation and maintenance are handled by different personnel from the personnel responsible for the switching system.

Moreover, the current trend is to install integrated services digital networks which cover the full range of communication requirements: voice, data, images and sound. The integration of services must therefore begin in the distribution network with the provision at the subscriber's premises of a terminal installation controlling a set of terminals such as, for example, a telephone, a facsimile machine, a data terminal equipment, etc, and dialoging with the digital subscriber exchange over a digital line, operating at 144 kbit/s, for example, carrying voice, data and signaling simultaneously, coding being carried out on the subscriber's premises.

An object of the invention is to connect local and remote analog and digital subscriber lines in a way which offers all subscribers the advantages of a digital network.

Another object of the invention, in the case of subscribers located in an area remote from a digital local exchange, is to combine these subscribers by means of connections to a satellite unit located in their area and to integrate the satellite unit into the exchange in such a way that these subscribers are no longer in any way "special", either with regard to the services offered to them or with regard to operation and maintenance procedures.

SUMMARY OF THE INVENTION

The invention consists in a digital satellite exchange for connecting analog and digital subscriber lines, comprising a digital connecting and control unit, a plurality of subscriber line digital concentrators of one or more of the following types:
 local analog subscriber line digital concentrator,
 remote analog subscriber line digital concentrator,
 local digital subscriber line digital concentrator,
 remote digital subscriber line digital concentrator,
 remote analog/digital subscriber line digital concentrator,
a respective multiplex link connecting each digital concentrator to the connecting and control unit, which is adapted to concentrate the multiplex links, and a further multiplex link adapted to connect the connecting and control unit to a digital local exchange.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 5 shows a remote digital subscriber line digital concentrator of FIG. 1.

FIG. 6 shows a digital connecting and control unit of FIG. 1.

DESCRIPTION OF THE PREFERRED EMBODIMENT

Figure 1:
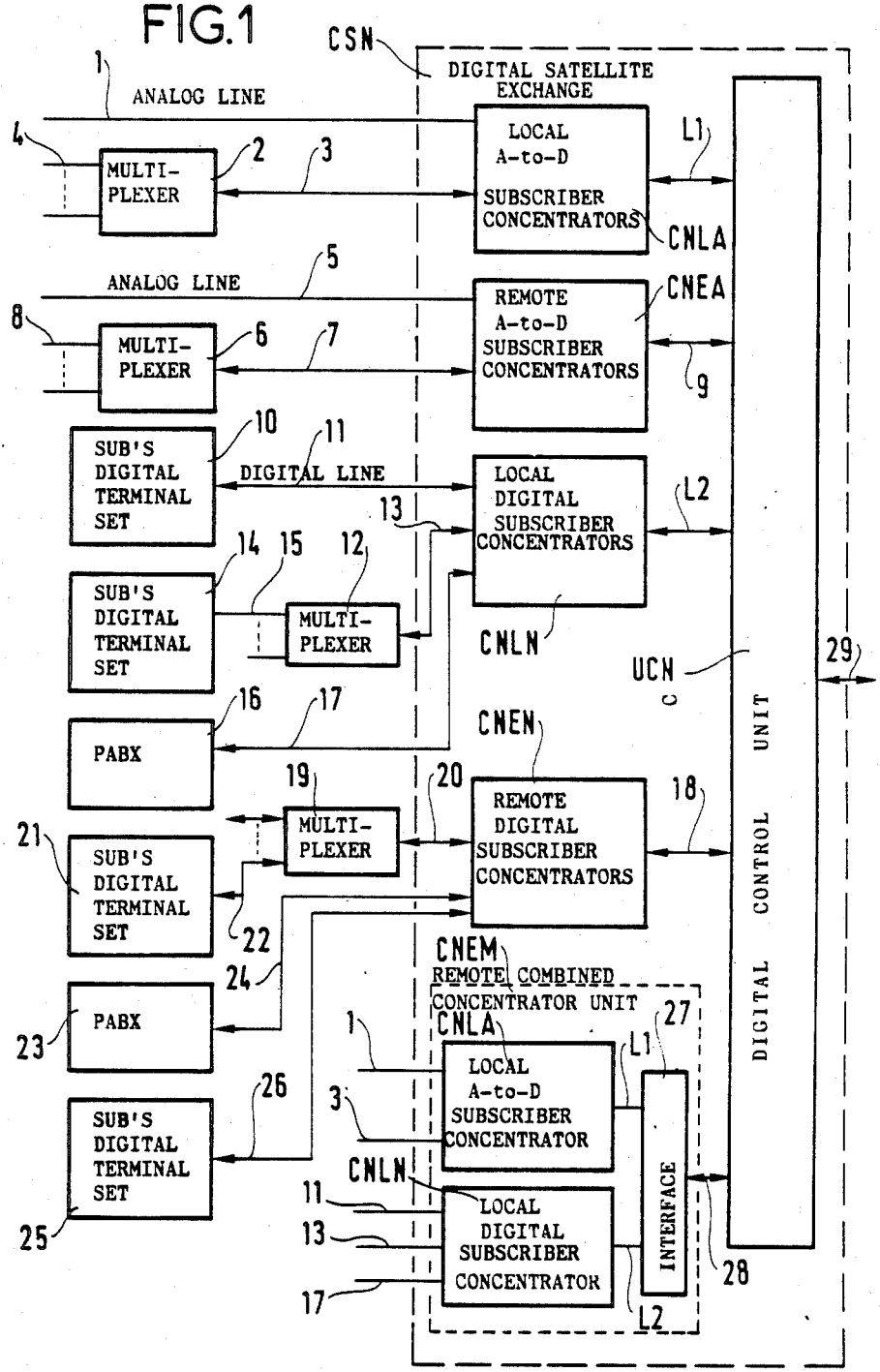
FIG. 1 shows the general architecture of a digital satellite exchange in accordance with the invention.

FIG. 1 shows the general architecture of a digital satellite exchange CSN in accordance with the invention, consisting of a digital connecting and control unit UCN, local analog subscriber line digital concentrators CNLA, remote analog subscriber line digital concentrators CNEA, local digital subscriber line digital concentrators CNLN, remote digital subscriber line digital concentrators CNEN and remote analog/digital subscriber line digital concentrators CNEM. The local digital concentrators CNLA and CNLN are located in the immediate proximity of the digital connecting and control unit UCN, in the same premises as the latter.

The remote digital concentrators CNEA, CNEN and CNEM are at various distances from the digital connecting and control unit UCN, to which they are connected by multiplex links. It will be understood that a digital satellite exchange CSN may comprise all or only certain types of digital concentrator. The digital connecting and control unit UCN connects the local and remote digital concentrators and provides access to a digital local exchange. It also supervises the digital satellite exchange.

A local analog subscriber line digital concentrator CNLA is connected to analog subscriber installations by subscriber lines such as subscriber line 1, and/or to at least one multiplexer 2, each multiplexer being connected to the concentrator by a medium speed (640 or 704 kbit/s) multiplex line 3; a multiplexer is connected to subscriber lines 4, the number of subscriber lines being nine for a speed of 640 kbit/s and ten for a speed of 704 kbit/s. The local digital concentrator CNLA is connected to the digital control unit UCN by a multiplex link L1 consisting of four 2 Mbit/s multiplex lines, the multiplex link offering 120 communication channels in each direction.

A remote analog subscriber line digital concentrator CNEA is connected to analog subscriber installations by subscriber lines such as subscriber line 5, and/or to at least one multiplexer 6, each multiplexer being connected to the concentrator by a medium speed multiplex line 7; a multiplexer is connected to subscriber lines 8, the number of subscriber lines being nine for a speed of 640 kbit/s and ten for a speed of 704 kbit/s. The remote digital concentrator CNEA is connected to the digital connecting and control unit UCN by a multiplex link 9 consisting of one to four 2 Mbit/s or medium speed multiplex lines, the number of multiplex lines depending on the number of subscriber lines connected to the remote concentrator.

A local digital subscriber line digital concentrator CNLN is connected to subscriber line terminal installations 10, each terminal installation being connected to the concentrator by a 144 kbit/s digital subscriber line 11, and/or to at least one multiplexer 12, each multiplexer being connected to the concentrator by a medium speed multiplex line 13; a multiplexer is connected to subscriber line terminal installations 14, each terminal installation being connected to the multiplexer by a 144 kbit/s digital subscriber line 15. The local digital subscriber line digital concentrator CNLN may also be connected to at least one multiservice private automatic branch exchange (PABX) 16, each PABX being connected to the concentrator by at least one 2 Mbit/s or medium speed (640 or 704 kbit/s) multiplex line 17. The local digital concentrator CNLN is connected to the digital connecting and control unit UCN by a multiplex link L2 consisting of four 2 Mbit/s multiplex lines.

A remote digital subscriber line digital concentrator CNEN is connected to the digital connecting and control unit UCN by a multiplex link 18 consisting of between one and four 2 Mbit/s or medium speed multiplex lines. The remote digital concentrator CNEN is connected to at least one multiplexer 19, each multiplexer being connected to the concentrator by a medium speed multiplex line 20; a multiplexer is connected to subscriber line terminal installations 21, each terminal installation being connected to the multiplexer by a 144 kbit/s digital subscriber line 22. The remote digital concentrator may also be connected to at least one multiservice PABX 23, each PABX being connected to the concentrator by at least one 2 Mbit/s or medium speed multiplex line 24. The remote digital concentrator may also be connected to subscriber line terminal installations 25, each terminal installation being connected by a 144 kbit/s digital subscriber line 26.

A remote analog/digital subscriber line digital concentrator CNEM is connected to the digital connecting and control unit UCN by a multiplex link 28 consisting of one to four 2 Mbit/s or medium speed multiplex lines. The remote analog/digital subscriber line digital concentrator comprises a local analog subscriber line digital concentrator CNLA, a local digital subscriber line digital concentrator CNLN and an interface circuit 27 connected on the one hand to each of the local concentrators and on the other hand to the multiplex link 28. The local analog subscriber line digital concentrator CNLA is connected to the subscribers' installation by the subscriber lines and to the multiplexers by the multiplex lines, as in the case of the concentrator CNLA described previously. Similarly, the local digital subscriber line digital concentrator CNLN is connected, as in the case of the concentrator CNLN described previously, to subscriber line terminal installations, to multiplexers and to multiservice PABXs.

The digital connecting and control unit UCN is connected to a digital local exchange by a multiplex link 29 comprising two to 16 two-way 2 Mbit/s multiplex lines.

It will be obvious that each type of concentrator CNLA, CNEA, CNLN and CNEN may comprise all the types of connection mentioned hereinabove, or only certain of these; the same applies to the concentrators CNLA and CNLN of the remote analog/digital subscriber line digital concentrator CNEM.

The digital satellite exchange CSN may be installed in the digital local exchange or may itself be sited remotely from the exchange, in order to group subscribers in an area remote from the exchange.

In the case of a local analog subscriber line digital concentrator CNLA, it must be understood that the term "subscriber line" encompasses both individual subscribers and PABXs connected to the concentrator by at least one subscriber line, although the local concentrator CNLA "sees" the PABXs in the same way as individual subscribers.

The 144 kbit/s digital subscriber lines comprise, in accordance with CCITT recommendations, two 64 kbit/s B channels for speech and data and a 16 kbit/s D channel for signaling, packet-switched data, remote alarm and telemetry indications; the combination of the two B channels and the D channel constitutes the basic level of access to a subscriber, such access being particularly suitable for the exchange of signaling information required for the operation of data terminals in integrated services digital networks. CCITT recommendations also define an expanded interface comprising n 64 kbit/s B channels and a 64 kbit/s D channel, where n is less than or equal to 30; the signals corresponding to an expanded interface of this kind are transmitted on a medium speed or 2 Mbit/s multiplex line.

Thus the digital satellite exchange of FIG. 1 provides for all types of connection and for the economic interconnection of areas of dispersed population, such as rural areas, and areas in which the population is grouped in "clusters", such as apartment buildings in an urban area, for example. It is benefical to connect analog and digital lines as close as possible to the subscribers, either to achieve a saving in terms of the number of cables in the distribution network or to increase the connection capacity of an existing network. The digital satellite exchange CSN provides for the connection of remote subscribers, from up to around ten in number in the case of analog subscriber lines, through the intermediary of a multiplexer, to up to 256 subscriber lines through the intermediary of a remote digital concentrator. Multiplexers and remote digital concentrators are generally connected by means of one or more multiplex lines, but a microwave link may also be used, according to the geographical situation of the unit to connect (multiplexer or remote concentrator). The use of a medium speed provides for utilization of the existing distribution network cables, which does not entail any additional cost for the connection of the unit to be connected (multiplexer or remote concentrator). The digital satellite exchange offers great flexibility in terms of connections since it provides for the connection of multiplexers either directly to a local type CNLA or CNLN concentrator or through the intermediary of a remote type CNEA or CNEN concentrator. The use of a remote analog/digital subscriber line digital concentrator CNEM facilitates the connection of subscribers since it provides for the connection of analog and digital subscriber lines at the same geographical location. The digital satellite exchange can be connected simultaneously to any mix of analog subscriber lines and digital subscriber lines, and even to multiservice PABXs. In order to allow for growth of the distribution network, it is necessary to facilitate operation by providing simple means of modifying the configuration of the connection units. To this end, a relay by means of a multiplexer is effected simply by replacing, in a local or remote concentrator, a subscriber line connection card with a multiplexer connection card; a relay by means of a remote concentrator is effected by adding interface cards for transmission lines operating at the appropriate speed to a local concentrator and to the input of the digital connecting and control unit UCN. This modular design of the equipment of the digital satellite exchange provides for implementation of a relay at minimum cost, with limited equipment in terms of the number and types of cards, which results in a minimum size maintenance spares set for the operating authority. These characteristics and advantages of the digital satellite exchange in accordance with the invention represented schematically in FIG. 1 are illustrated by FIGS. 2 to 6.

Figure 2:
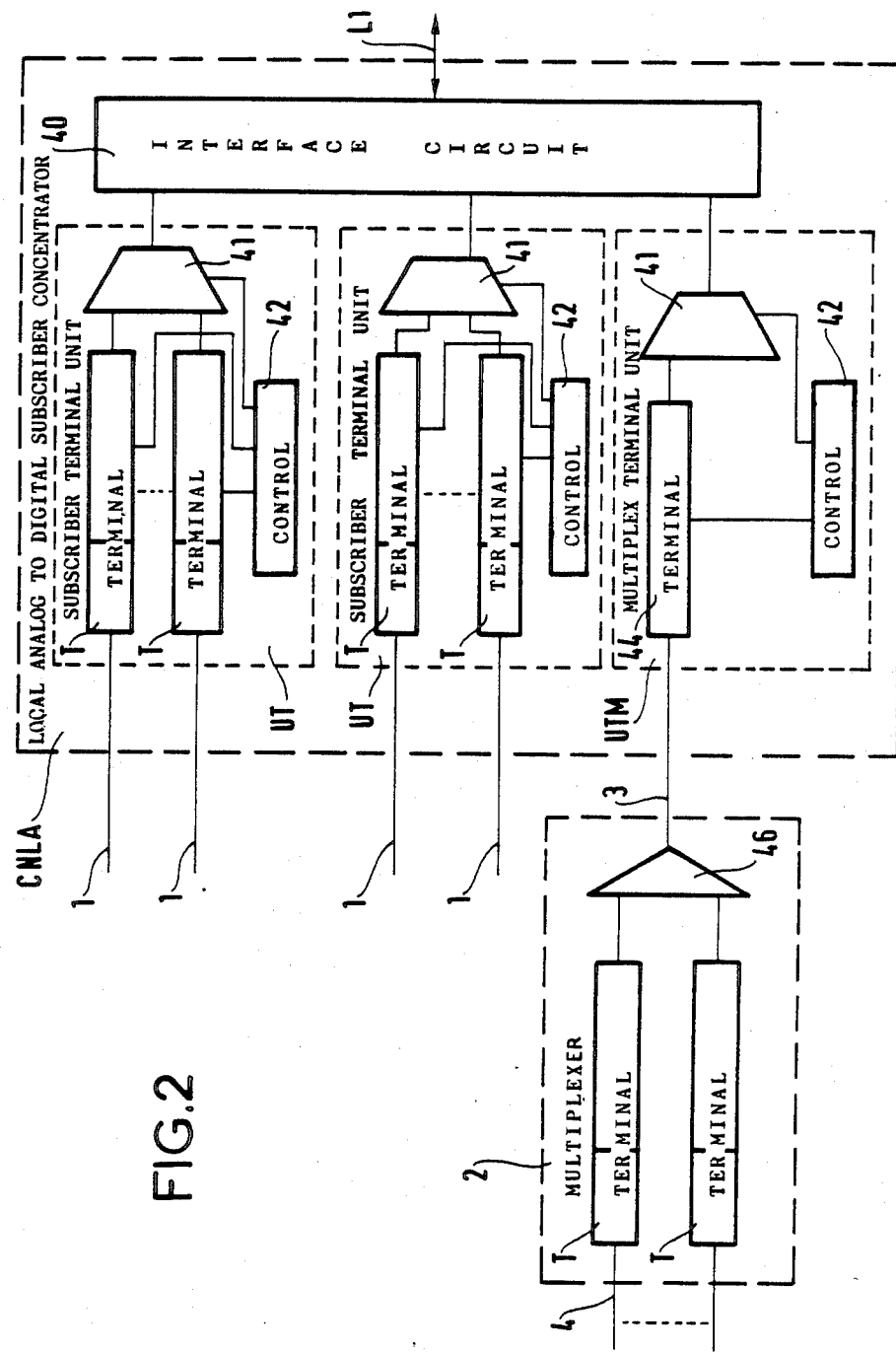
FIG. 2 shows a local analog subscriber line digital concentrator of FIG. 1.

FIG. 2 shows by way of example a local analog subscriber line digital connentrator CNLA and an analog subscriber line multiplexer 2 from FIG. 1. The local concentrator CNLA is of the type described in published French patent application No. 2 513 470 entitled Terminal Unit Group for a Digital Exchange, corresponding to U.S. Pat. No. 4,499,575. The local digital concentrator CNLA of FIG. 2 comprises an interface circuit 40, subscriber line terminal units UT and a multiplexer terminal unit UTM. A subscriber line terminal unit UT comprises a certain number (for example, 16) of subscriber terminals T each connected to a subscriber line 1, a first digital concentration stage 41 and a secondary control unit 42 connected to each terminal and to the first concentration stage 41. Each subscriber terminal T comprises an SLIC junctor and a coder-/decoder/filter circuit, and implements all the functions designated by the term BORSCHT, these functions comprising power supply, protection against overloads, the ringing signal, supervision, coding/decoding and filtering, two-wire/four-wire conversion and tests. A definition of the term BORSCHT will be found in the periodical IEEE-SPECTRUM of February 1977, page 46. Each subscriber line terminal T is connected to the first digital concentration stage 41 which is itself connected to the interface circuit 40. A multiplexer terminal unit UTM comprises a muliplexer terminal 44 (which is an interface circuit) a first digital concentration stage 41 and a secondary control unit 42 connected to the interface circuit 44 and to the first digital concentration stage 41, which is itself connected to the interface circuit 40. The interface circuit 44 is connected by a multiplex line 3 to an analog subscriber line multiplexer 2 which comprises subscriber line terminals T identical to those of a terminal unit UT and an interface circuit 46 providing the link between the terminals T and the interface circuit 44 via the muliplex link 3. Each subscriber line terminal T of the multiplexer 2 is connected to a subscriber line 4. The interface circuit 46 handles the multiplexing and demultiplexing of signals from and to the subscriber line terminals. The interface circuit 40 is connected to the multiplex link L1 which connects the local digital concentrator CNLA to the digital connecting and control unit UCN (FIG. 1). This interface circuit 40 is a duplicated clock and synchronization circuit which is also described in the published French patent application No. 2 513 470 already mentioned. This circuit generates the synchronization and clock signals required by the terminal units UT and UTM, and comprises synchronization circuits in series with the four multiplex lines of the multiplex link L1. The terminal units UT and UTM each consist of a single circuit card. It is therefore easy to modify the structure of the local digital concentrator CNLA by replacing a subscriber line terminal unit UT card with a multiplexer terminal unit UTM card and vice versa.

Figure 3:
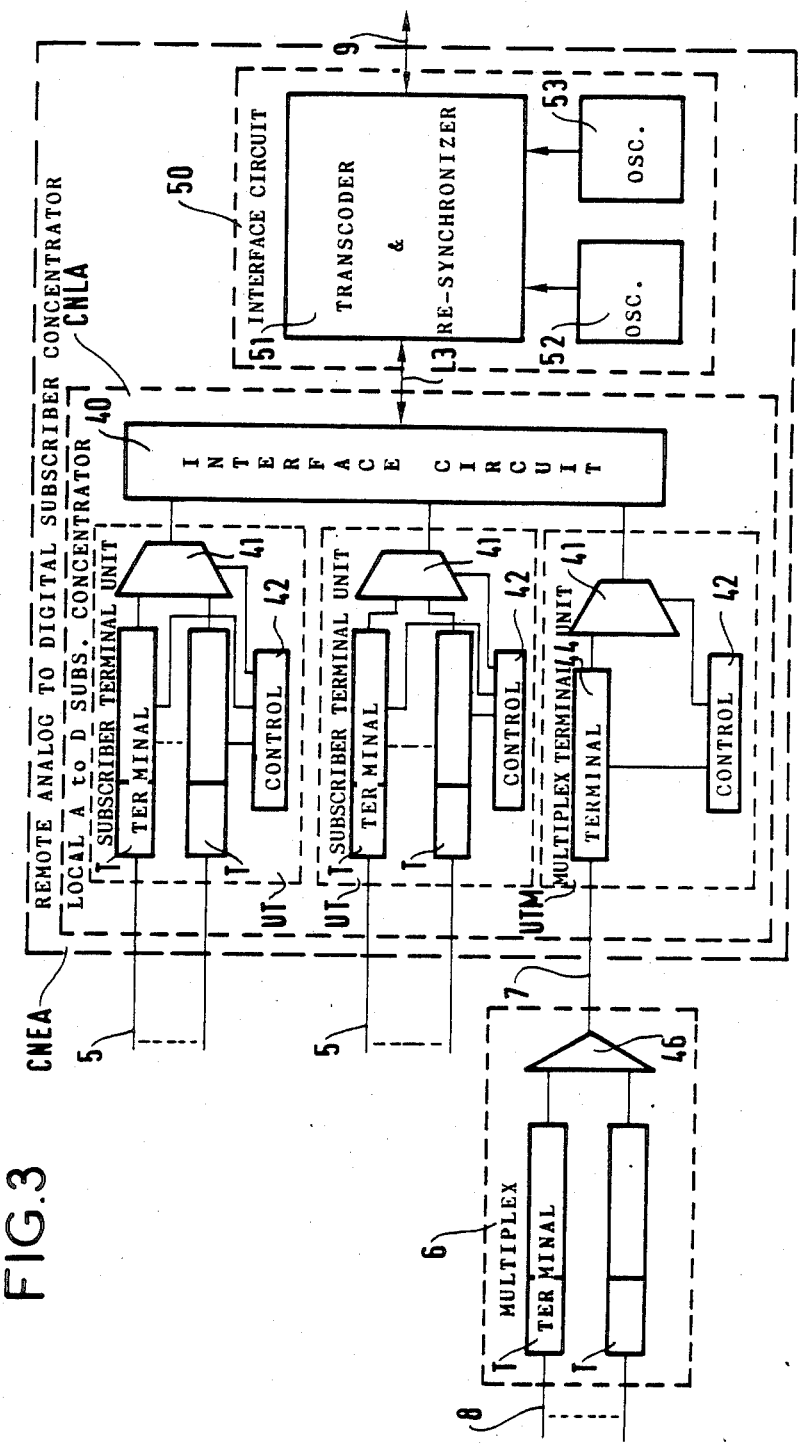
FIG. 3 shows a remote analog subscriber line digital concentrator of FIG. 1.

FIG. 3 shows by way of example a remote analog subscriber line digital concentrator CNEA and an analog subscriber line multiplexer 6 from FIG. 1. The remote digital concentrator CNEA of FIG. 3 comprises a local analog subscriber line digital concentrator CNLA identical to that of FIG. 2 and an interface circuit 50 connected by a multiplex link L3 to the local digital concentrator CNLA. This multiplex link L3 is identical to the multiplex link L1 of FIG. 2, and comprises four 2 Mbit/s multiplex lines. The interface circuit 50 is connected to the digital connecting and control unit UCN by the multiplex link 9 and comprises a transcoding and re-synchronization circuit 51 and one or two oscillators 52, 53 synchronized by means of the clock recovered from the multiplex link 9 which control the remote digital concentrator CNEA, there being one oscillator when the multiplexed link comprises a single multiplexed line and two oscillators when it comprises at least two multiplexed lines. There is a transcoding and re-synchronization card for each 2 Mbit/s or medium speed multiplex line constituting the multiplex link 9. The transcoding and re-synchronization function are well-known to those skilled in this art. In the local digital concentrator CNLA each terminal T is connected to a subscriber line 5 and the interface 44 of the multiplexer terminal unit UTM is connected by a multiplex line 7 to an analog subscriber line multiplexer 6 identical to the multiplexer 2 of FIG. 2 and connected to subscriber lines 8. As indicated in the description with reference to FIG. 1, the analog subscriber line multiplexers 6 are connected to nine or ten subscriber lines and thus comprise nine or ten terminals T, the multiplex line 7 operating at medium speed, 640 kbit/s in the case of nine subscriber lines or 704 kbit/s in the case of ten subscriber lines.

Figure 4:
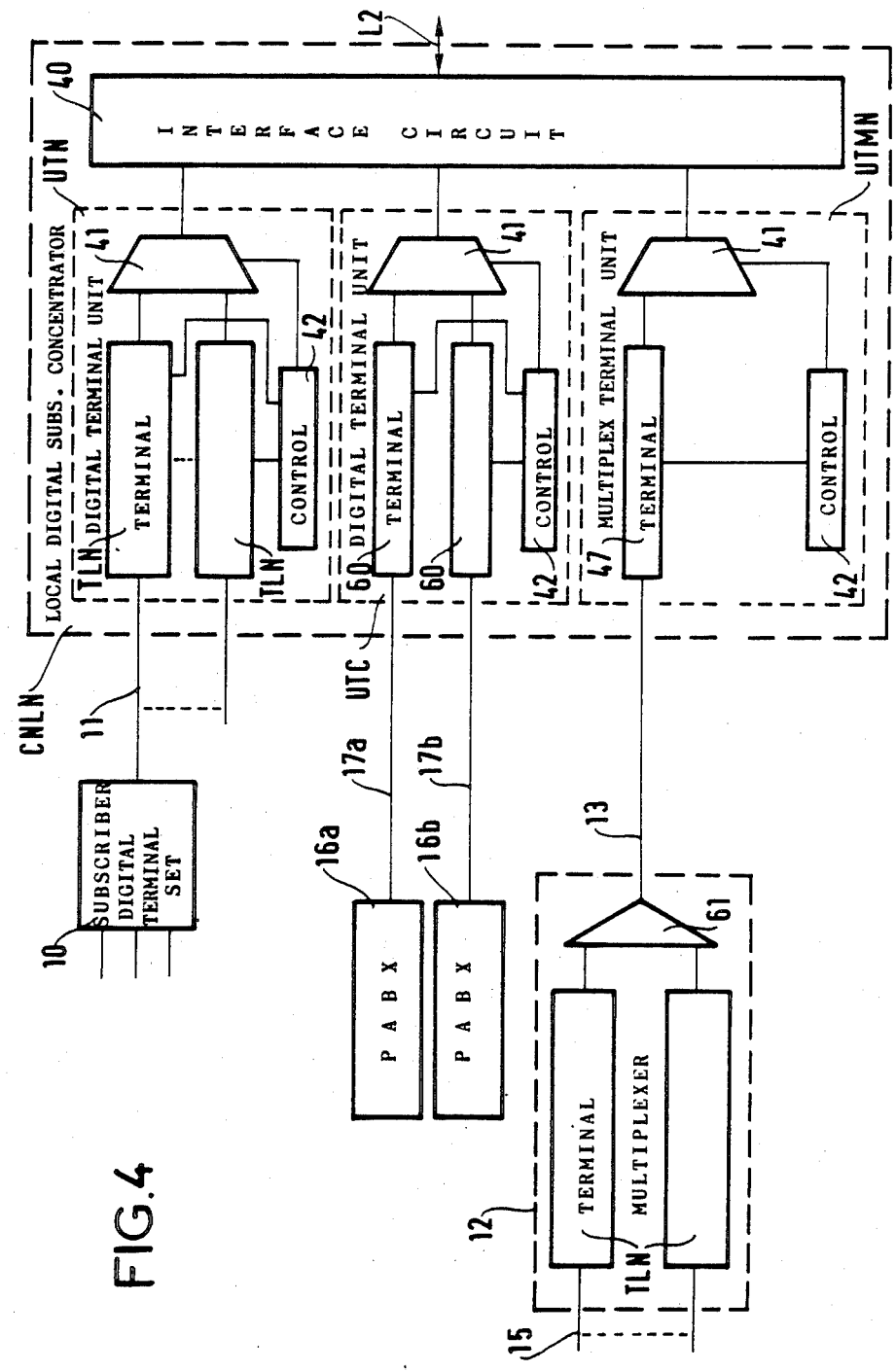
FIG. 4 shows a local digital subscriber line digital concentrator of FIG. 1.

FIG. 4 shows a local digital subscriber line digital concentrator CNLN and a multiplexer 12 from FIG. 1. In FIG. 4, the concentrator CNLN comprises, for example, a digital terminal unit UTN connected to subscriber line terminal installations such as installation 10, an exchange terminal unit UTC connected to multiservice PABXs such as PABXs 16a and 16b, and a digital multiplexer terminal unit UTMN connected to a digital subscriber line multiplexer 12. The terminal units are connected to an interface circuit 40 identical to that of concentrators CNLA and CNEA of FIGS. 2 and 3.

A digital terminal unit UTN comprises digital subscriber line terminals TLN connected to a first digital concentration stage 41 and a secondary control unit 42 connected to each terminal TLN and to the first digital concentration stage 41. Each digital subscriber line terminal TLN is connected by a 144 kbit/s digital subscriber line 11 to a subscriber line terminal installation 10 and provides an interface for various 144 kbit/s transmission systems: half-duplex, four-wire link or echo suppresser systems. A line terminal also provides for extraction of the 64 kbit/s B channels and the 16 kbit/s D channels carrying signaling and packet-switched data.

An exchange terminal unit UTC comprises, for example, two interface circuits 60 connected to a first digital concentration stage 41 and a secondary control unit 42 connected to each interface circuit and the first digital concentration stage 41. Each interface circuit 60 is connected to a multiservice PABX 16a, 16b by a respective multiplex line 17a, 17b.

A digital multiplexer terminal unit UTMN comprises an interface circuit 47, a first concentration stage 41 and a secondary control unit 42 connected to the interface circuit 47 and to the first concentration stage 41. The interface 47 is connected by a multiplex line 13 to a digital subscriber line multiplexer 12 which comprises digital subscriber line terminals TLN identical to those of a digital terminal unit UTN connected to an interface circuit 61 handling the multiplexing and demultiplexing of signals to or from the digital multiplexer terminal unit UTMN by the multiplex line 13. Each digital subscriber line terminal TLN is connected by a digital subscriber line 15 to a subscriber line terminal installation. The first digital concentration stage 41 of each of the terminal units UTN, UTC, UTMN is connected to the interface circuit 40 which is itself connected by the multiplex link L2 to the digital connecting and control unit UCN.

The first digital concentration stage 41 and the secondary control unit 42 are identical to those of FIGS. 2 and 3, and it will be understood that the local digital subscriber line digital concentrator CNLN may comprise one or more terminal units UTN, UTC and UTMN shown in FIG. 4, or certain only of these terminal units.

FIG. 5 shows a remote digital subscriber line digital concentrator CNEN from FIG. 1, comprising a local digital subscriber line digital concentrator CNLN identical to that of FIG. 4 and an interface circuit 50 identical to that of FIG. 3. Each digital subscriber line terminal TLN of the digital terminal unit UTN is connected by a digital subscriber line 26 to a subscriber line terminal installation 25. Each interface circuit 60 of the exchange terminal unit UTC is connected by a multiplex line 24a, 24b to a multiservice PABX 23. The interface circuit 47 of the digital multiplexer terminal unit UTMN is connected by a multiplex line 20 to digital subscriber line multiplexer 19 identical to the multiplexer 12 of FIG. 4. The local digital subscriber line digital concentrator CNLN is connected by a 2 Mbit/s multiplex link L4 identical to the multiplex link L2 of FIG. 4. The interface circuit 50 is connected by the multiplex link 18 to the connecting and control unit UCN of FIG. 1, this link consisting of one to four 2 Mbit/s or medium speed multiplex lines.

As was indicated in the description with reference to FIG. 1, the remote analog/digital subscriber line digital concentrator CNEM comprises a local analog subscriber line digital concentrator CNLA and a local digital subscriber line digital concentrator CNLN. These concentrators are thus identical to those described with reference to and shown in FIGS. 2 and 4, the interface circuit 27 being identical to the interface circuit 50 of FIGS. 3 and 5.

FIG. 6 shows schematically the digital connecting and control unit UCN of FIG. 1, which comprises a time-division switching network RCX, a primary control unit UC and digital concentrator interface circuits 62, 63, 64. These interface circuits are of a first type when the multiplex links 9, 18, 28 which connect them to a remote concentrator are 2 Mbit/s links and of a second type when they are medium speed multiplex links. They are thus identical, and consequently interchangeable if all or some of the multiplex links 9, 18, 28 are of the same speed.

The remote analog subscriber line digital concentrator CNEA is connected by the multiplex link 9 to the interface circuit 62 which is itself connected to the switching network RCX by a 2 Mbit/s multiplex link 65. The remote digital subscriber line digital concentrator CNEN is connected by the multiplex link 18 to the interface circuit 63 which is itself connected to the time-division switching network RCX by a 2 Mbit/s multiplex link 66. The remote analog/digital subscriber line digital concentrator CNEM is connected by the multiplex link 28 to the interface circuit 64 which is itself connected to the time-division switching network RCX by a 2 Mbit/s multiplex link 67. The local analog subscriber line digital concentrator CNLA and the local digital subscriber line digital concentrator CNLN are connected directly to the time-division switching network RCX by the 2 Mbit/s multiplex links L1 and L2, respectively. The time-division switching network is connected to a multiplex link connection module of the digital local exchange by the 2 Mbit/s multiplex link 29, this multiplexed link comprising two to 16 two-way 2 Mbit/s multiplex lines. The time-division switching network RCX constitutes the second concentration stage of the digital satellite exchange CSN of the invention and thus provides for the two-way connection of analog and digital subscriber lines to the digital local exchange. The time-division switching network RCX is controlled by the primary control unit UC which is connected to the switching network. This primary control unit handles dialog with the digital subscriber exchange using the CCITT's No 7 common-channel signaling system and dialog with the digital concentrators using the channel-allocated procedure employing a time slot of the frames of the multiplexed links L1, L2, 65, 66, 67, the time slot TS 6, for example, the frames being divided into 32 time slots.

As previously stated, the digital satellite exchange may comprise different types of digital concentrators: local, remote or analog/digital. The time-division switching network RCX provides for connecting the digital satellite exchange to the local exchange by means of 16 2 Mbit/s multiplexed lines which constitute the multiplex link 29. On the subscriber line side, the switching network may be connected to digital concentrators representing up to 42 2 Mbit/s multiplexed lines. This provides for up to 2048 subscribers scattered over some 20 different sites to be connected to remote digital concentrators which are themselves extended via the multiplexers. The digital satellite exchange in accordance with the invention is therefore ideally suited to equipping high telephone density areas such as urban and industrial areas and also low telephone density areas, such as, for example, rural areas with dispersed population. The digital satellite exchange can also connect up to 120 local calls which do not need to pass through the digital subscriber exchange. This facility for setting up local calls constitutes a considerable advantage in the implementation of a telephone network.

Moreover, the facility for equipping a digital concentrator of a given type with subscriber line terminal unit cards, exchange terminal cards or multiplexer terminal cards confers great flexibility of connection, complementing the facility for using any type of digital concentrator.

It will be understood that various changes in the details, materials and arrangements of parts, which have been herein described as illustrated in order to explain the nature of the invention, may be made by those skilled in the art in the principle and the scope of the invention as expressed in the appended claims.

I claim:

1. A digital satellite exchange for connecting analog and digital subscriber lines to a digital local exchange, said satellite exchange comprising:
   a digital connection and control unit,
   a plurality of subscriber line digital concentrators selected from the following types:
      local analog subscriber line digital concentrator,
      remote analog subscriber line digital concentrator,
      local digital subscriber line digital concentrator,
      remote analog/digital subscriber line digital concentrator type,
   a respective multiplex link connecting each digital concentrator to said connection and control unit, which connection and control unit is adapted to concentrate the multiplex links, and
   a further multiplex link for connecting said connection and control unit to said digital local exchange.

2. A digital satellite exchange according to claim 1, wherein said plurality of subscriber line digital concentrators includes at least one of: a local or remote analog subscriber line digital concentrator comprising a plurality of subscriber line terminal units and/or multiplexer terminal units, wherein a subscriber line terminal unit comprises a plurality of subscriber line terminals each of which is connected to a subscriber line and each of which is adapted to digitize speech signals and to match the subscriber line; and a multiplexer terminal unit comprising an interface circuit, a multiplexer which comprises subscriber line terminals each connected to a subscriber line, a multiplex line connecting said interface circuit to said multiplexer.

3. A digital satellite exchange according to claim 1, wherein said plurality of subscriber line digital concentrators includes at least one of a local or remote digital subscriber line digital concentrator each of which comprises a plurality of digital terminal units and/or exchange terminal units and/or digital multiplexer terminal units, wherein a digital terminal unit comprises digital subscriber line terminals each adapted to be connected by a digital line to a subscriber line terminal installation on the subscriber's premises, wherein an exchange terminal unit comprises interface circuits each adapted to be connected by a multiplex line to a multiservice private automatic branch exchange, and wherein a digital multiplexer terminal unit comprises interface circuits, a multiplexer which comprises digital subscriber line terminals, subscriber line terminal installations and digital lines connecting said digital subscriber line terminals to said subscriber line terminal installations, and a multiplex line connecting said interface circuits to said multiplexer.

4. A digital satellite exchange according to claim 1, wherein said plurality of subscriber line digital concentrators includes at least one remote analog/digital subscriber line digital concentrator comprising a local analog subscriber line digital concentrator, a local digital subscriber line digital concentrator and an interface circuit connected to each local concentrator and to the digital control unit, the local analog subscriber line digital concentrator comprising a plurality of subscriber line terminal units and/or multiplexer terminal units, and the local digital subscriber line digital concentrator comprising a plurality of digital terminal units and/or exchange terminal units and/or digital multiplexer terminal units.

* * * * *